(12) United States Patent
Hines et al.

(10) Patent No.: US 9,313,645 B2
(45) Date of Patent: Apr. 12, 2016

(54) RLP ROUTER

(71) Applicant: TeleCommunication Systems, Inc., Annapolis, MD (US)

(72) Inventors: Gordon John Hines, Kirkland, WA (US); Paul Thompson, Bothell, WA (US); Kambiz Ghozati, Ellicott City, MD (US); Lynne Seitz, Seattle, WA (US); Joseph Hannan, Snoqualmie, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 247 days.

(21) Appl. No.: 13/922,815

(22) Filed: Jun. 20, 2013

(65) Prior Publication Data

US 2013/0344865 A1 Dec. 26, 2013

Related U.S. Application Data (63) Continuation-in-part of application No. 13/348,836, filed on Jan. 12, 2012, which is a continuation-in-part of application No. 13/374,104, filed on Dec. 12, 2011.

(60) Provisional application No. 61/457,138, filed on Jan. 12, 2011, provisional application No. 61/457,029, filed on Dec. 13, 2010, provisional application No. 61/664,388, filed on Jun. 26, 2012.

(51) Int. Cl.
*H04W 4/00* (2009.01)
*H04W 8/10* (2009.01)
*H04W 8/12* (2009.01)

(52) U.S. Cl.
CPC .. *H04W 8/10* (2013.01); *H04W 8/12* (2013.01)

(58) Field of Classification Search
None
See application file for complete search history.

(56) References Cited

U.S. PATENT DOCUMENTS 6,766,168 B1 * 7/2004 Lim ..................... 455/435.1
2005/0239480 A1 10/2005 Kim
(Continued)

OTHER PUBLICATIONS

TAM. "MSF Whitepaper on Location Services in LTE Networks" in MultiService Forum. Apr. 2010. Retrieved from http://www.msforum.org/techinfo/reports/MSF-TR-SERVICES-))%-FINAL.pdf on Aug. 21, 2013.
(Continued)

*Primary Examiner* — Suhail Khan
(74) *Attorney, Agent, or Firm* — Tarolli, Sundheim, Covell & Tumino LLP (57) ABSTRACT

A practical inter-carrier roaming solution by way of a roaming location protocol (RLP) router that provides consistent location support across heterogeneous wireless network standards. The RLP router maintains connectivity to each location server in a roaming ecosystem, alleviating the need for an expensive and impractical mesh network of location servers. When a home location server (H-LS) determines it cannot locate a subscriber device because the subscriber device is roaming, the H-LS sends an RLP request to the RLP router. The RLP router then routes the RLP request to a serving location server (S-LS), which subsequently returns location information for the roaming subscriber device. The RLP router maintains mobile switching center ID (MSCID) to location based services (LBS) mappings for routing RLP requests. The RLP router may also maintain rough MSC-level positioning data for each MSCID to enable the RLP router to resolve certain location fixes without utilizing an S-LS.

11 Claims, 5 Drawing Sheets

(56) References Cited

U.S. PATENT DOCUMENTS

| | | |
|---|---|---|
| 2006/0058042 A1* | 3/2006 | Shim ........................ 455/456.3 |
| 2006/0258369 A1* | 11/2006 | Burroughs et al. ........ 455/456.1 |
| 2007/0149213 A1* | 6/2007 | Lamba et al. .............. 455/456.1 |
| 2008/0259869 A1 | 10/2008 | Wang |
| 2008/0318575 A1 | 12/2008 | Ulupinar |
| 2009/0104904 A1* | 4/2009 | Shim ........................... 455/433 |
| 2009/0176488 A1* | 7/2009 | Shim ........................... 455/432.1 |
| 2010/0234022 A1 | 9/2010 | Winterbottom |
| 2010/0311439 A1* | 12/2010 | Thomson et al. .......... 455/456.1 |
| 2011/0034179 A1 | 2/2011 | David |
| 2011/0312280 A1 | 12/2011 | Wachter |
| 2013/0012232 A1* | 1/2013 | Titus et al. ................. 455/456.2 |

OTHER PUBLICATIONS

International Search Report received in PCT/US2013/047835 dated Sep. 6, 2013.

* cited by examiner

RLP ROUTER

The present invention is a continuation-in-part of U.S. patent application Ser. No. 13/348,836, entitled "Location Services Agent", filed Jan. 12, 2012; which is a continuation-in-part of U.S. patent application Ser. No. 13/374,104, filed on Dec. 12, 2011; which claims priority from U.S. Provisional No. 61/457,138, entitled "Location Services Agent", filed Jan. 12, 2011 and from 61/457,029, entitled "Location Services Gateway Server", filed Dec. 13, 2010. The present invention also claims priority from U.S. Provisional No. 61/664,388, filed Jun. 26, 2012, entitled "RLP Router", the entirety of all of which are expressly incorporated herein by reference.

BACKGROUND OF THE INVENTION

1. Field of the Invention

This invention relates generally to wireless telecommunication. More particularly, it relates to location roaming in CDMA, GSM, IMS/LTE, SUPL, etc. environments.

2. Background of the Related Art

Conventional wireless devices typically contain multiple cellular radios to support roaming onto different networks, e.g., Code Division Multiple Access (CDMA) networks, Global System for Mobile Communications (GSM) networks, Long Term Evolution (LTE)/IP Multimedia Systems (IMS) networks, Wi-Fi, Secure User Plane Location (SUPL), etc. A wireless device is roaming when operating on a network other than the device's home/direct network.

Conventional $3^{rd}$ Generation Partnership Project (3GPP) standards use a Roaming Location Protocol (RLP), developed by an Open Mobile Alliance (OMA) standards body, to support location determination of roaming subscriber devices. A Roaming Location Protocol (RLP) is an inter-location server protocol over which location servers exchange positioning data for devices roaming on a visited network.

Figure 4:
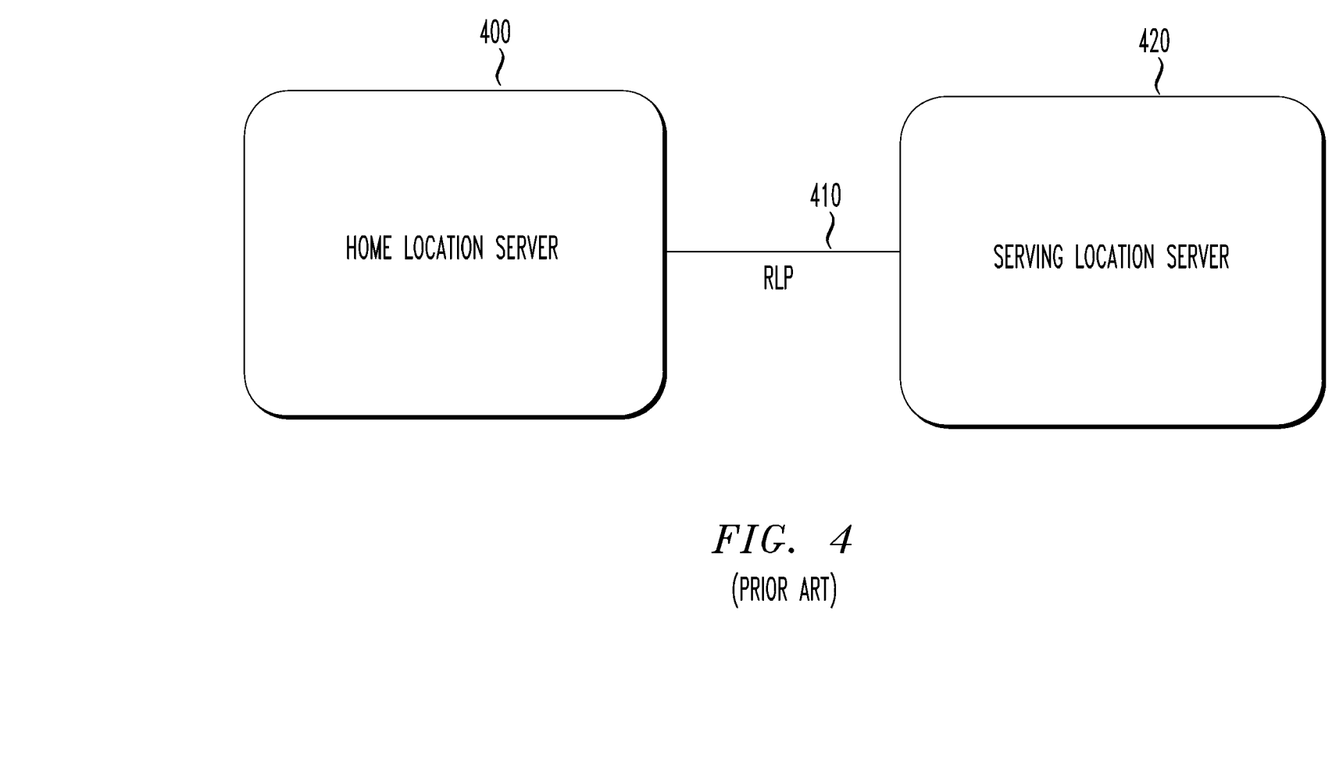
FIG. 4 depicts a conventional implementation of the Roaming Location Protocol (RLP).

FIG. 4 depicts a conventional implementation of the Roaming Location Protocol (RLP).

As portrayed in FIG. 4, a home location server (H-LS) 400 and a serving location server (S-LS) 420 (i.e. a location server currently serving a roaming subscriber device) exchange positioning data for a roaming subscriber device via Roaming Location Protocol (RLP) 410 messages.

Location servers supported within the Roaming Location Protocol (RLP) include Gateway Mobile Location Centers (GMLC) (i.e. GSM location servers) SUPL Location Platforms (SLP) (i.e. SUPL location servers), and Mobile Positioning Centers (MPC) (i.e. CDMA location servers).

The $3^{rd}$ Generation Partnership Project (3GPP) specifically adopted the Roaming Location Protocol (RLP) to provide roaming location support within Secure User Plane Location (SUPL) and Global System for Mobile Communications (GSM) technologies. The Roaming Location Protocol (RLP) also provides roaming location support for Code Division Multiple Access (CDMA) technologies (CDMA support is introduced in RLP 1.1). However, CDMA standards do not yet support the Roaming Location Protocol (RLP).

Unfortunately, several issues arise when attempting to use the Roaming Location Protocol (RLP) as specified within 3GPP standards and as proposed for CDMA. For instance, conventional implementations of the Roaming Location Protocol (RLP) do not provide location heterogeneity. In particular, the Roaming Location Protocol (RLP) does not directly support location determination for subscriber devices roaming on a visited carrier network (i.e. any carrier network that differs from a device's home/direct carrier network). Hence, positioning data is not obtainable for, e.g., a U.S. CDMA carrier device roaming on a European GSM network.

Moreover, the Roaming Location Protocol (RLP) relies on a mesh network of interconnected location servers.

Figure 5:
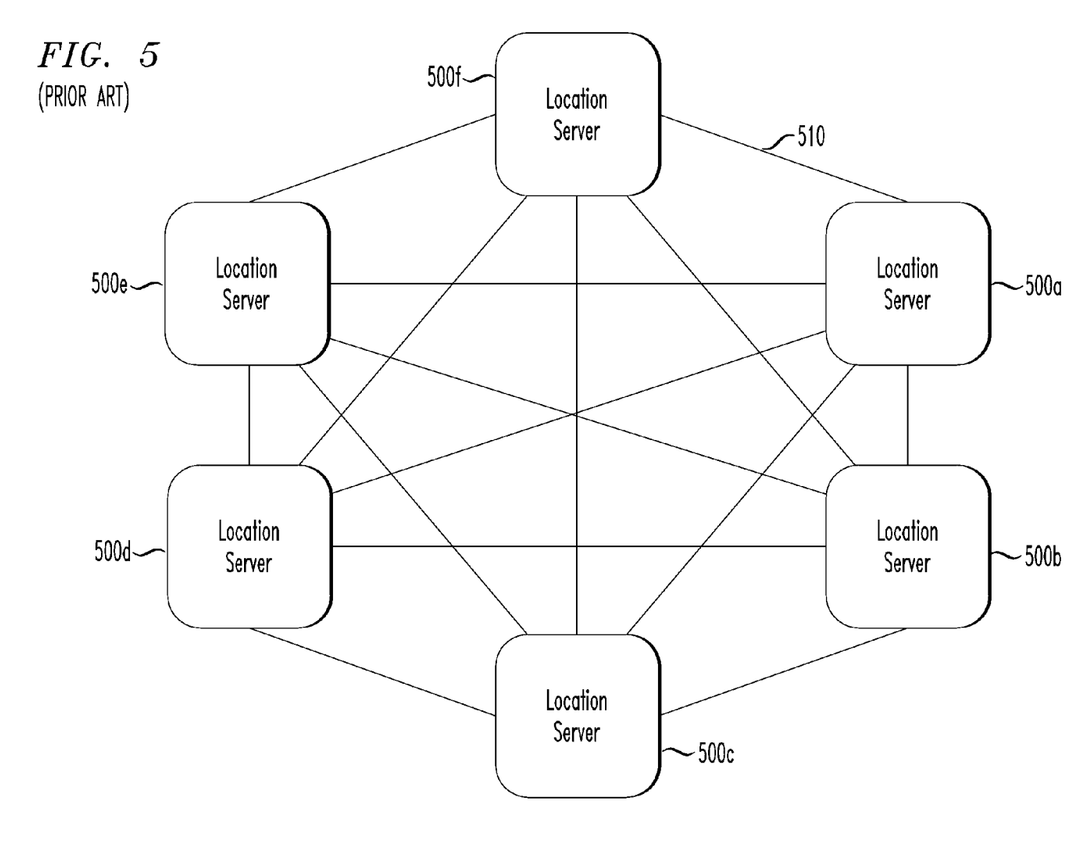
FIG. 5 depicts a conventional mesh network of location servers.

FIG. 5 depicts an exemplary mesh network of location servers.

As depicted in FIG. 5, conventional 3GPP standards require a location server to know about and maintain connectivity to all other location servers in a roaming ecosystem. This requirement results in an expensive and impractical mesh network 510 of location servers 500a-500f. A mesh network 510 of location servers 500a-500f increases a network carrier's vulnerabilities, as it introduces multiple ingress/egress points in to a network. Multiple ingress/egress points in a network also presents cost and risk issues, since each ingress/egress point must be maintained, monitored, and controlled.

The Roaming Location Protocol (RLP), as defined for GSM and SUPL, requires an expensive mesh network 510 of location servers 500a-500f and is therefore typically not adopted in practice. When the Roaming Location Protocol (RLP) is implemented, the solution is cost prohibitive.

An SS7 mechanism is defined for roaming location support within the CDMA control-plane. However, this SS7 mechanism is cost-prohibitive and therefore not adopted in practice.

Moreover, a proprietary solution is defined for roaming location support within the CDMA user-plane. However, this solution unfavorably requires carriers to share network descriptions with other carriers, and is therefore not adopted in practice.

Additional solutions do exist for user-plane roaming. However, adoption of these standards is lacking due in part to: partial carrier support for the user-plane, low SUPL V2.0 adoption (within which user-plane roaming is defined), undesirability of Base Station Almanac data sharing (a requirement in conventional user-plane roaming standards), and difficulty justifying a return on investment (ROI).

Additional solutions also exist for control-plane roaming. However, adoption of these standards is lacking due in part to: a lack of inter-carrier agreements, a low adoption of IS-881 roaming features (which define several location request signaling messages), a cost prohibitive LPREQ feature (an IS-41 message used to query a home location register (HLR) for the address of a serving location server (S-LS)), interoperability issues resulting from dissimilar vendor implementations, prohibitive costs of features, maintenance mappings, translations, etc., and difficulty justifying a return on investment (ROI).

Conventional roaming solutions do not provide consistent location support for CDMA networks, nor do they provide consistent location support across heterogeneous network standards.

Standard roaming solutions also fail to identify the cost disparity between coarse location and precise location fixes. A coarse location fix (typically resolved by a location server) is a relatively inexpensive activity that does not significantly tax a serving infrastructure. Alternatively, a precise location fix is expensive to a serving infrastructure, since session license costs are high. Infrastructure utilization is also considerably higher for a precise location fix, since interaction for a precise location fix stretches all the way to a target device. Failure to account for the cost disparity between coarse and precise location fixes is another factor preventing adoption of conventional location roaming solutions.

BRIEF DESCRIPTION OF THE DRAWINGS

Features and advantages of the present invention will become apparent to those skilled in the art from the following description with reference to the drawings, in which.

SUMMARY OF THE INVENTION

A practical inter-carrier roaming solution for providing consistent location support across heterogeneous network standards (e.g. Global System for Mobile Communications (GSM), Secure User Plane Location (SUPL), Code Division Multiple Access (CDMA), Long Term Evolution (LTE)/IP Multimedia Subsystem (IMS), etc.), comprises a Roaming Location Protocol (RLP) router. The inventive RLP router maintains connectivity to each location server in a roaming ecosystem, thereby alleviating the need for an expensive and impractical mesh network of location servers. In accordance with the principles of the present invention, a home location server (H-LS) need only maintain connectivity to an RLP router to obtain consistent roaming location support.

In accordance with the principles of the present invention, when a home location server (H-LS) (e.g. GMLC, MPC, SLP, etc.) determines that it cannot obtain location information for a target subscriber device because that target subscriber device is roaming, the home location server (H-LS) sends an RLP request for location information to the RLP router 100. The RLP router then routes the RLP request to an appropriate serving location server (S-LS) (i.e. a location server currently serving the target subscriber device). The serving location server (S-LS) subsequently responds to the RLP request with location information for the roaming subscriber device and the RLP router routes location information back to the requesting home location server (H-LS).

The RLP router resides outside of any carrier network. In accordance with the principles of the present invention, the RLP router maintains mobile switching center ID (MSCID) to location based services (LBS) mappings, to route RLP requests. In a particular embodiment, the RLP router may also maintain rough, MSC-level positioning data for each MSCID stored thereon.

DETAILED DESCRIPTION OF ILLUSTRATIVE EMBODIMENTS

The present invention provides a practical inter-carrier roaming solution by way of an inventive Roaming Location Protocol (RLP) router. The inventive inter-carrier roaming solution provides consistent location support across heterogeneous network standards, e.g., Global System for Mobile Communications (GSM), Secure User Plane Location (SUPL), Code Division Multiple Access (CDMA), Long Term Evolution (LTE)/IP Multimedia Subsystem (IMS), etc.

Conventional user-plane and control-plane roaming solutions are cost prohibitive and typically not adopted in practice.

Conventional $3^{rd}$ Generation Partnership Project (3GPP) standards use a Roaming Location Protocol (RLP) to support location determination of roaming subscriber devices. Unfortunately, conventional implementations of the Roaming Location Protocol (RLP) rely on an expensive and impractical mesh network of location servers and do not provide location support across heterogeneous network standards.

The inventive RLP router alleviates prohibitive costs associated with conventional control-plane and user-plane roaming solutions and overcomes implementation shortcomings associated with conventional 3GPP RLP usage.

Figure 1:
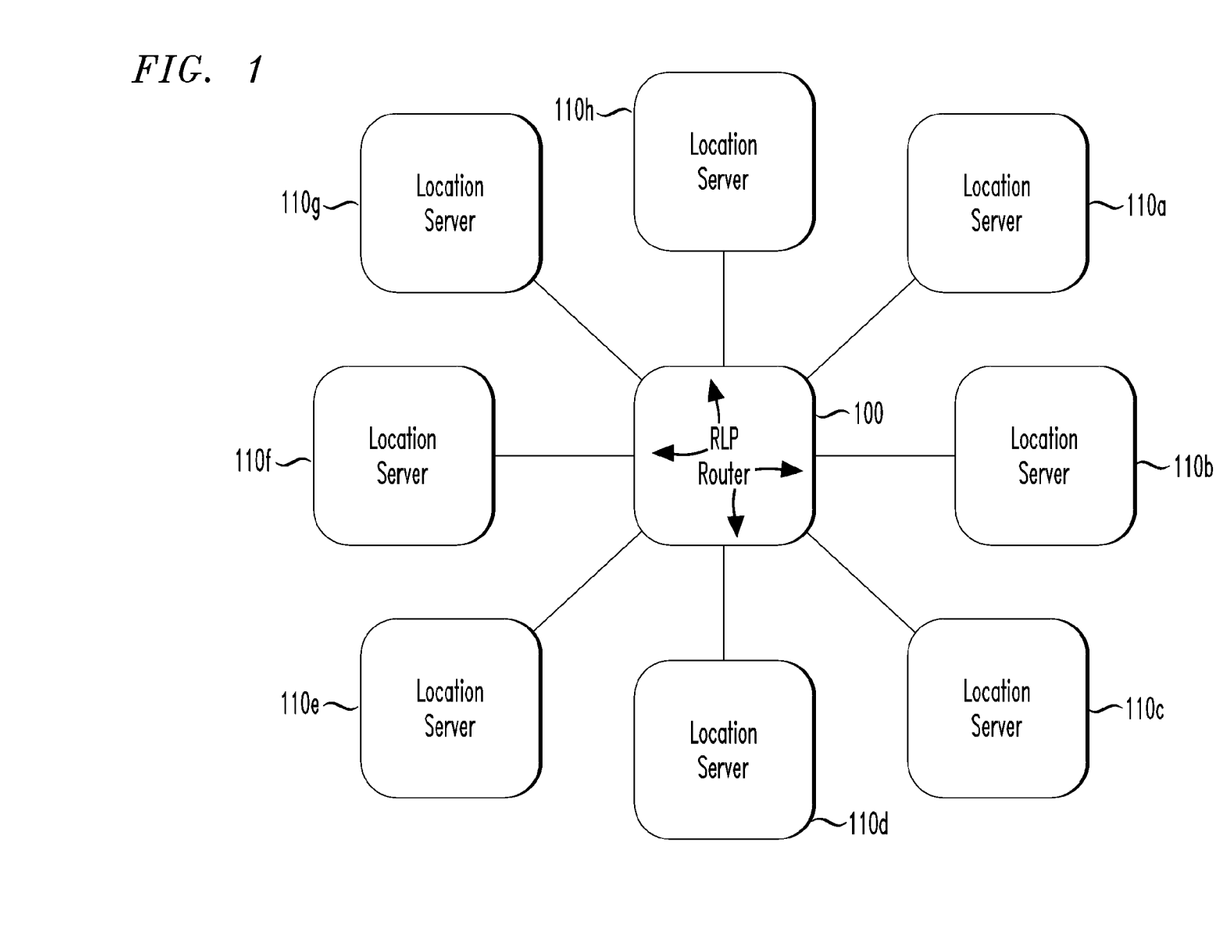
FIG. 1 shows an exemplary RLP router, in accordance with the principles of the present invention.

FIG. 1 shows an exemplary RLP router, in accordance with the principles of the present invention.

As portrayed in FIG. 1, an RLP router 100 maintains connectivity to each location server 110a-110h in a roaming ecosystem. In accordance with the principles of the present invention, a home location server (H-LS) queries an RLP router, as opposed to a serving location server (S-LS), to request location information for a roaming subscriber device. This solution alleviates the need for a home location server (H-LS) to know about and maintain connectivity to every other location server in existence.

The disclosed embodiments of an RLP router 100 reside outside any carrier's network. In accordance with the principles of the present invention, when a home location server (H-LS) (e.g. a gateway mobile location center (GMLC), a mobile positioning center (MPC), a SUPL location platform (SLP), etc.) determines that location information for a target subscriber device is unobtainable because the target subscriber device is roaming, the home location server (H-LS) sends an RLP request for location information to the RLP router 100. The RLP router 100 then routes the RLP request to an appropriate serving location server (S-LS) (i.e. a location server currently serving the target subscriber device). The serving location server (S-LS) subsequently responds to the RLP request with location information for the roaming subscriber device, and the RLP router routes location information back to the home location server (H-LS).

In accordance with the principles of the present invention, a home location server (H-LS) need only maintain connectivity to an RLP router 100 to achieve consistent location roaming support. Thus, the present invention alleviates the need for a mesh network of location servers (as previously depicted in FIG. 5).

Figure 2:
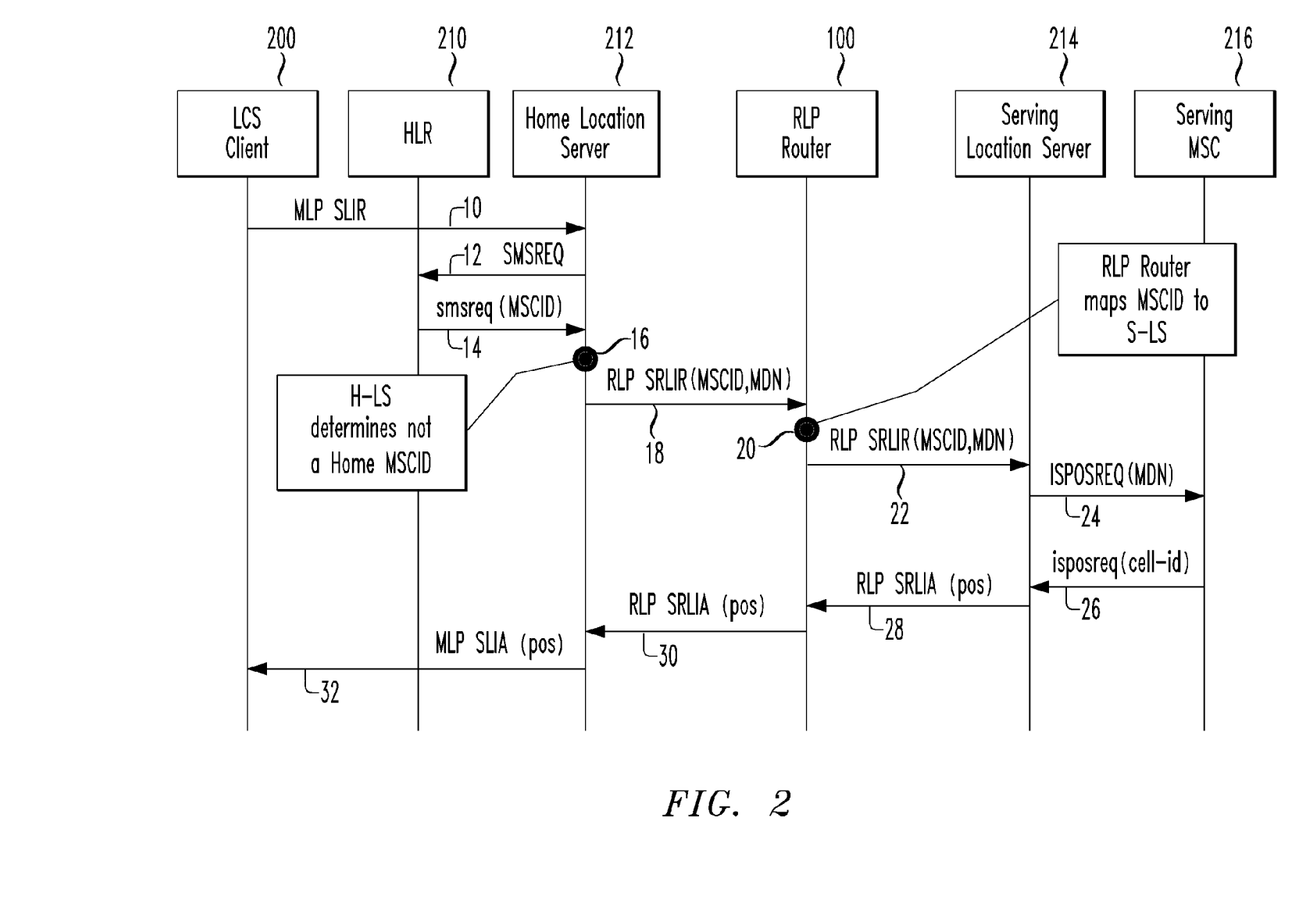
FIG. 2 shows an exemplary process flow for obtaining a coarse location fix for a roaming subscriber device using an RLP router, in accordance with the principles of the present invention.

FIG. 2 shows an exemplary process flow for obtaining a coarse location fix for a roaming subscriber device using an RLP router, in accordance with the principles of the present invention.

As portrayed in step 10 of FIG. 2, a location service client (LCS) 200 sends a mobile location protocol (MLP) standard location immediate request (SLIR) message to a home location server (H-LS) (e.g. an MPC, GMLC, SLP, etc.) 212, requesting location information for a target subscriber device.

As depicted in step 12, the home location server (H-LS) 212 sends a short message service request (SMSREQ) message to a home location register (HLR) 210 to request location information for the target subscriber device.

In step 14, the home location register (HLR) 210 returns an SMSREQ result message to the home location server (H-LS) 212, with the address (i.e. an MSCID) of a mobile switching center (MSC) currently serving the target subscriber device (i.e. a serving mobile switching center (S-MSC)) 216.

In step 16, the home location server (H-LS) 212 receives the MSCID of the serving mobile switching center (S-MSC)

216 and determines that the serving mobile switching center (S-MSC) 216 is not a home mobile switching center (H-MSC) (i.e. the target subscriber device is roaming).

As depicted in step 18, the home location server (H-LS) 212 then sends a roaming location protocol (RLP) standard roaming location immediate request (SRLIR) message to the inventive RLP router 100, containing the MSCID of the serving mobile switching center (S-MSC) 216 and a mobile directory number (MDN) for the target subscriber device.

In step 20, the RLP router 100 maps the MSCID received thereon, to a serving location server (S-LS) (i.e. a location server currently serving the target subscriber device) (e.g. an MPC, GMLC, SLP, etc.) 214.

As depicted in step 22, the RLP router 100 forwards the RLP SRLIR message received thereon to the serving location server (S-LS) 214 (identified in step 20).

In step 24, the serving location server (S-LS) 214 receives the RLP SRLIR message and transmits an intersystem position request (ISPOSREQ) message to the serving mobile switching center (S-MSC) 216, with the mobile directory number (MDN) of the target subscriber device.

In step 26, the serving mobile switching center (S-MSC) 216 returns an intersystem position request (ISPOSREQ) result message to the serving location server (S-LS) 214, comprising a cell ID of a base station currently serving the target subscriber device.

In step 28, the serving location server (S-LS) 214 returns a roaming location protocol (RLP) standard roaming location immediate answer (SRLIA) message to the inventive RLP router 100, with positioning data for the cell ID of the base station currently serving the target subscriber device.

As depicted in step 30, the RLP router 100 then forwards the RLP SRLIA message received thereon to the home location server (H-LS) 212.

In step 32, the home location server (H-LS) 212 returns a mobile location protocol (MLP) standard location immediate answer (SLIA) message to the requesting location service (LCS) client 200, containing positioning data for the cell ID of the base station currently serving the target subscriber device.

Note that FIG. 2 depicts exemplary flows/scenarios supported by the inventive RLP router 100, and not a complete set of flows/scenarios.

Figure 3:
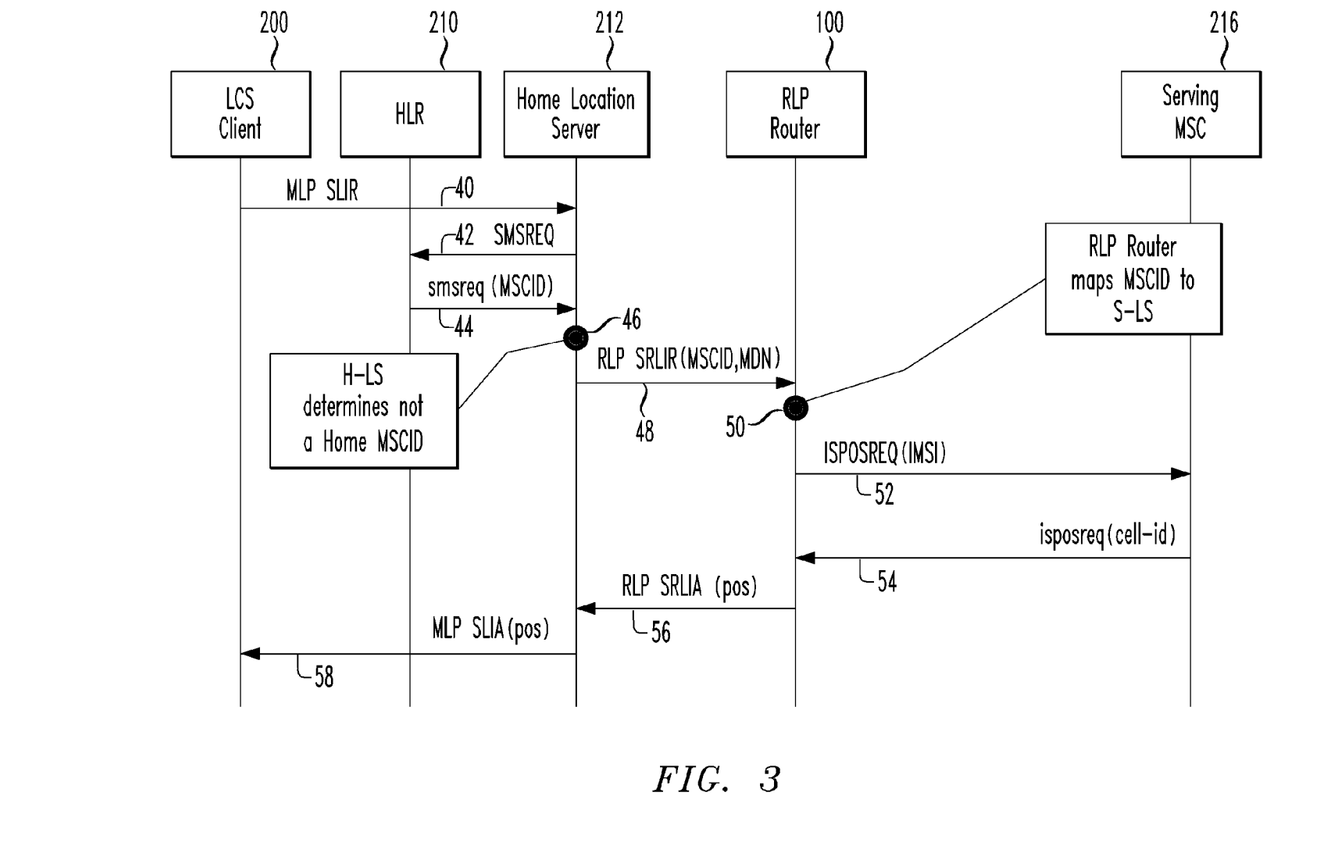
FIG. 3 shows another embodiment of an exemplary process flow for using an RLP router to obtain a coarse location fix for a roaming subscriber device, in accordance with the principles of the present invention.

FIG. 3 shows another embodiment of an exemplary process flow for using an RLP router to obtain a coarse location fix for a roaming subscriber device, in accordance with the principles of the present invention.

As portrayed in step 40 of FIG. 3, a location service client (LCS) 200 sends a mobile location protocol (MLP) standard location immediate request (SLIR) message to a home location server (H-LS) (e.g. an MPC, GMLC, SLP, etc.) 212, requesting location information for a target subscriber device.

As depicted in step 42, the home location server (H-LS) 212 sends a short message service request (SMSREQ) message to a home location register (HLR) 210, requesting location information for the target subscriber device.

In step 44, the home location register (HLR) 210 returns an SMSREQ result message to the home location server (H-LS) 212, with the address (i.e. an MSCID) of a mobile switching center (MSC) currently serving the target subscriber device (i.e. a serving mobile switching center (S-MSC)) 216.

In step 46, the home location server (H-LS) 212 receives the MSCID of the serving mobile switching center (S-MSC) 216 and determines that the serving mobile switching center (S-MSC) 216 is not a home mobile switching center (H-MSC) (i.e. the target subscriber device is roaming).

As depicted in step 48, the home location server (H-LS) 212 sends a roaming location protocol (RLP) standard roaming location immediate request (SRLIR) message to the inventive RLP router 100, containing the MSCID of the serving mobile switching center (S-MSC) 216 and a mobile directory number (MDN) for the target subscriber device.

In step 50, the RLP router 100 maps the MSCID received thereon, to a serving location server (S-LS) (i.e. a location server currently serving the target subscriber device), e.g., an MPC, GMLC, SLP, etc.

As depicted in step 52, the RLP router 100 transmits an intersystem position request (ISPOSREQ) message to the serving mobile switching center (S-MSC) 216, containing an international mobile subscriber identity (IMSI) for the target subscriber device.

In step 54, the serving mobile switching center (S-MSC) 216 returns an intersystem position request (ISPOSREQ) result message to the RLP router 100, with the cell ID of a base station currently serving the target subscriber device.

In step 56, the RLP router 100 returns a standard roaming location immediate answer (SRLIA) message to the home location server (H-LS) 212, with positioning data for the cell ID of the base station currently serving the target subscriber device.

As depicted in step 58, the home location server (H-LS) 212 then returns a mobile location protocol (MLP) standard location immediate answer (SLIA) message to the requesting location service (LCS) client 200, containing positioning data for the cell ID of the base station currently serving the target subscriber device.

An RLP router 100 may also maintain extremely rough location descriptions for various carrier networks. For rough location support, precise location generally refers to GPS positioning. Coarse location generally refers to cell-site sector (and its derivatives) positioning, and rough location, in accordance with the principles of the present invention, is a term introduced to represent positioning at the MSC footprint level (or even broader). The disclosed RLP router 100 contains a mapping of MSCIDs to affiliated location based services (LBS). In a particular embodiment, the RLP router 100 may also maintain a rough position of each MSC's footprint.

In accordance with the principles of the present invention, the RLP router 100 uses rough location descriptions to return extremely rough location information to a home location server (H-LS) 212 when, e.g., a serving location server (S-LS) 214 is unknown, or, e.g., when only extremely rough location information is requested.

For instance, an RLP router 100 may return a rough MSC level position to a home location server (H-LS) 212 when RLP quality of service (QoS) requirements (for LCS support) indicate a rough accuracy location request.

Moreover, an RLP router 100 may provide rough, MSC level location information to a home location server (H-LS) 212 when an accuracy policy for a serving wireless carrier only allows MSC rough accuracy, and/or when a throttling policy for a serving wireless carrier would otherwise cause a location request to be rejected.

Additionally, an RLP router 100 may return rough, MSC level location information to a home location server (H-LS) 212 when a serving location server (S-LS) 214 fails a location request and does not return a fallback MSC rough position result to the RLP router 100 (some MSCs provide a fallback MSC rough position result and some do not).

By maintaining rough location data, the RLP router 100 is able to resolve certain location fixes without utilizing a serving location server (S-LS) 214.

The RLP router 100 is intended to provide global roaming location support. The disclosed RLP router 100 contains CDMA MSC rough location information for those carriers subscribed to the inventive inter-carrier roaming solution. In accordance with the principles of the present invention, an RLP router database is populated with reliable and accurate global CDMA, GSM, SUPL, and IMS/LTE data. The disclosed inter-carrier roaming solution enables at least rough location support for all subscribers, wherever voice roaming agreements are in place.

The disclosed RLP router 100 has general benefits. For instance, when wireless carriers implement an inter-carrier roaming solution by way of an RLP router 100, wireless carriers are not required to agree on an all user-plane or all control-plane implementation. Moreover, the RLP router 100 alleviates the need for special MSC features and additional control-plane signaling system number 7 (SS7) connectivity. The spoke and hub design of the inventive roaming solution reduces the cost of network connectivity for a wireless carrier. Further, the inventive roaming solution does not require wireless carriers to share cell-databases.

Use of an RLP router alleviates the need for a home location server (H-LS) to maintain a mapping of MSCIDs to serving location servers (S-LS). Instead, all mappings are performed in the RLP router. Hence, the inventive roaming solution resolves cost and risk issues associated with a mesh network of location servers.

The disclosed RLP router can also enforce requestor authentication, authorization, and throttling policies to protect a serving wireless carrier. Moreover, the RLP router can enforce a serving carrier position-accuracy policy, and may also support 4G/LTE Roaming Location Protocol (RLP) (reducing network complexity, etc.)

The RLP router respects privacy policies defined for each home network carrier and is not a location aggregator play. In accordance with the principles of the present invention, the RLP router preferably disallows a wireless carrier to locate subscribers of another wireless carrier.

The disclosed RLP router maintains only MSCID to location based services (LBS) mappings used to route RLP requests. In a particular embodiment, the RLP router may also maintain rough MSC-level positioning data.

The inventive RLP router is a cost effective, low barrier to entry solution to the conventional difficulties of location roaming. The disclosed RLP router is capable of routing between heterogeneous networks, and can resolve extremely rough location fix requests.

The disclosed embodiments of the RLP router focus on coarse and rough location. Technical obstacles concerning the RLP router are based on a given carrier's desire for unilateral precise location.

The present invention has particular applicability to cellular carriers that utilize or provide location roaming. For instance, a group of carriers may form a roaming partnership.

While the invention has been described with reference to the exemplary embodiments thereof, those skilled in the art will be able to make various modifications to the described embodiments of the invention without departing from the true spirit and scope of the invention.

What is claimed is:

1. A method of implementing an inter-carrier roaming solution for providing consistent location support across heterogeneous network standards including a Long Term Evolution (LTE) network standard, comprising:
   receiving a location request for a roaming subscriber device at a home location server (H-LS);
   sending a roaming location protocol (RLP) request with a mobile switching center identification (MSCID) of a serving mobile switching center (SMSC) to a roaming location protocol (RLP) router;
   mapping said MSCID received in said RLP request to an affiliated serving location server (S-LS);
   sending, from said RLP router, an intersystem position request to said serving location server (S-LS) in response to said mapping;
   receiving, at said RLP router, location information for said roaming subscriber device from said serving location server (S-LS); and
   returning, by said RLP router, said location information received for said roaming subscriber device to said home location server (H-LS).

2. The method of implementing an inter-carrier roaming solution for providing consistent location support across heterogeneous network standards according to claim 1, wherein:
   said mapping is performed at said RLP router.

3. The method of implementing an inter-carrier roaming solution for providing consistent location support across heterogeneous network standards according to claim 1, wherein:
   said RLP router maintains a mapping of mobile switching center identifications (MSCIOs) to affiliated location based services (LBS).

4. The method of implementing an inter-carrier roaming solution for providing consistent location support across heterogeneous network standards according to claim 1, wherein:
   said RLP router lies outside of any network carrier.

5. The method of implementing an inter-carrier roaming solution for providing consistent location support across heterogeneous network standards according to claim 1, wherein:
   said RLP router maintains connectivity to each location server in a roaming ecosystem.

6. The method of implementing an inter-carrier roaming solution for providing consistent location support across heterogeneous network standards according to claim 1, wherein:
   said RLP router alleviates the need for a mesh network of location servers.

7. The method of implementing an inter-carrier roaming solution for providing consistent location support across heterogeneous network standards according to claim 1, wherein said heterogeneous network standards comprise:
   a code division multiple access (COMA) network standard.

8. The method of implementing an inter-carrier roaming solution for providing consistent location support across heterogeneous network standards according to claim 1, wherein said heterogeneous network standards comprise:
   a secure user plane location (SUPL) network standard.

9. The method of implementing an inter-carrier roaming solution for providing consistent location support across heterogeneous network standards according to claim 1, wherein said heterogeneous network standards comprise:
   a Global System for Mobile Communications (GSM) network standard.

10. The method of implementing an inter-carrier roaming solution for providing consistent location support across heterogeneous network standards according to claim 1, wherein:
    said RLP router maintains rough MSC-level positioning data for said MSCIOs.

11. The method of implementing an inter-carrier roaming solution for providing consistent location support across heterogeneous network standards according to claim 10, wherein said heterogeneous network standards comprise:

said RLP router uses said rough MSC-level positioning data to return extremely rough location information to a home location server (H-LS) without utilizing a serving location server (S-LS).

* * * * *